(12) United States Patent
Kosuge (10) Patent No.: US 10,539,692 B2
(45) Date of Patent: Jan. 21, 2020

(54) RADIATION IMAGING APPARATUS AND RADIATION IMAGING SYSTEM

(71) Applicant: CANON KABUSHIKI KAISHA, Tokyo (JP)

(72) Inventor: Asato Kosuge, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 15/724,156

(22) Filed: Oct. 3, 2017

(65) Prior Publication Data

US 2018/0095181 A1    Apr. 5, 2018

(30) Foreign Application Priority Data

Oct. 5, 2016 (JP) .................................. 2016-196897

(51) Int. Cl.
*G01T 1/24* (2006.01)
*H04N 5/357* (2011.01)

(52) U.S. Cl.
CPC .............. *G01T 1/247* (2013.01); *H04N 5/357* (2013.01)

(58) Field of Classification Search
CPC .......... G01T 1/247; H04N 5/32; H04N 5/357
USPC ....................................................... 378/116
See application file for complete search history.

(56) References Cited

U.S. PATENT DOCUMENTS

| 8,759,782 | B2 * | 6/2014 | Okada | H01L 27/14603 |
| | | | | 250/366 |
| 9,301,725 | B2 * | 4/2016 | Kaneko | A61B 6/4233 |
| 9,551,794 | B2 * | 1/2017 | Uchiyama | G01T 1/17 |
| 9,774,794 | B2 * | 9/2017 | Sakino | H04N 5/32 |
| 10,009,990 | B2 * | 6/2018 | Takenaka | H04N 5/32 |
| 2010/0020933 | A1 * | 1/2010 | Topfer | G06T 5/50 |
| | | | | 378/98.11 |
| 2014/0036118 | A1 * | 2/2014 | Dowaki | H04N 5/2173 |
| | | | | 348/294 |
| 2015/0043715 | A1 * | 2/2015 | Kuwabara | H04N 5/32 |
| | | | | 378/62 |
| 2016/0370225 | A1 * | 12/2016 | Iwashita | H04N 5/32 |
| 2017/0048467 | A1 * | 2/2017 | Chuang | H04N 5/2256 |

FOREIGN PATENT DOCUMENTS

| EP | 2685710 A2 * | 1/2014 | .......... A61B 6/5258 |
| JP | 2014-23957 A | 2/2014 | |
| JP | 2017-009324 A | 1/2017 | |

* cited by examiner

*Primary Examiner* — Taeho Jo
(74) *Attorney, Agent, or Firm* — Canon U.S.A., Inc. IP Division (57) ABSTRACT

A radiation imaging apparatus includes a control unit that controls a radiation image capturing operation performed by a pixel array based on determination of start of radiation irradiation based on comparison between a measured value that is an amount of change with respect to a reference value and acquired using a detection unit for detecting irradiation of the pixel array with radiation and a threshold value in one of positive and negative with respect to the reference value. The control unit changes the threshold value within a predetermined range and according to the measured value in other range of the positive and the negative.

19 Claims, 10 Drawing Sheets

RADIATION IMAGING APPARATUS AND RADIATION IMAGING SYSTEM

BACKGROUND

Field

The present disclosure relates to a radiation imaging apparatus, a radiation imaging system, and an irradiation start detecting method.

Description of the Related Art

Some radiation imaging apparatuses electrically capture optical images formed by radiation, such as X-rays. There are broadly two types of methods employed by the radiation imaging apparatuses. One is a direct-type method by which radiation is directly converted into electric signals, and another is an indirect-type method by which radiation is converted into light by a scintillator and then the light is converted into electric signals. The radiation imaging apparatuses need to execute a radiation image capturing operation in synchronization with the start of radiation irradiation, regardless of the method type. Examples of the synchronization methods include a method by which a synchronizing signal is transmitted from a control device of a radiation source to a radiation imaging apparatus, and a method by which a radiation imaging apparatus irradiated with radiation detects such radiation. Japanese Patent Application Laid-Open No. 2014-23957 discusses a radiation imaging apparatus that detects start of radiation irradiation based on an electric signal arising from an electric charge generated in a sensor unit.

As discussed in Application Laid-Open No. 2014-23957, the radiation imaging apparatus irradiated with radiation detects the radiation to detect the start of radiation irradiation. However, such a method may incorrectly detect the start of radiation irradiation if noise in a signal having sensitivity to radiation irradiation is large.

SUMMARY

The present invention provides a technique that prevents or reduces incorrect detection.

According to an aspect of the present disclosure, a radiation imaging apparatus includes a pixel array in which a plurality of pixels is arrayed to capture a radiation image, a detection unit configured to detect irradiation of the pixel array with radiation, and a control unit configured to control a radiation image capturing operation performed by the pixel array according to determination of start of radiation irradiation based on comparison between a measured value that is an amount of change with respect to a reference value and acquired using the detection unit and a threshold value in one of positive and negative with respect to the reference value, wherein the control unit changes the threshold value within a predetermined range and according to the measured value in the other of the positive and the negative.

Further features will become apparent from the following description of exemplary embodiments with reference to the attached drawings.

DESCRIPTION OF THE EMBODIMENTS

Figure 1:
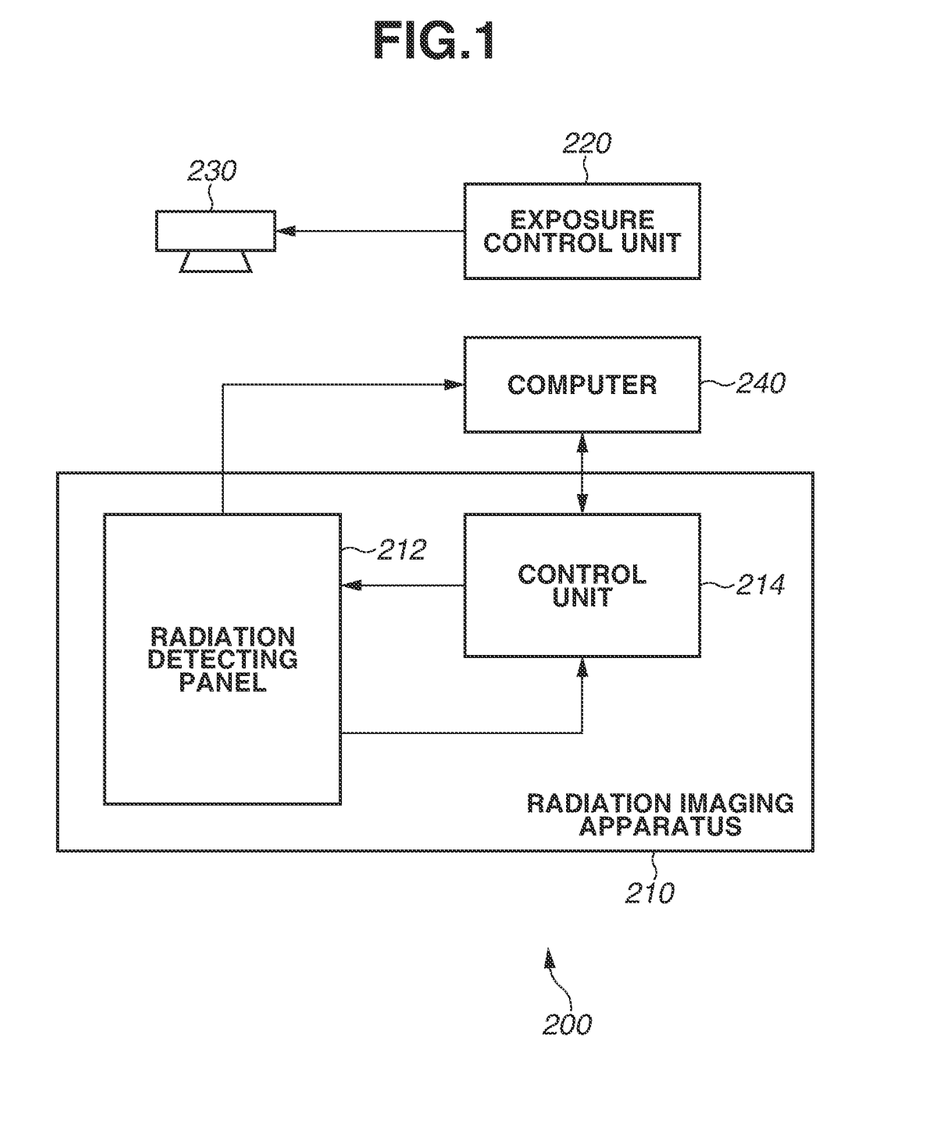
FIG. 1 is a diagram illustrating a configuration of a radiation imaging system according to a first exemplary embodiment.

FIG. 1 illustrates a configuration of a radiation imaging system 200 according to a first exemplary embodiment. The radiation imaging system 200 electrically captures an optical image formed by radiation to acquire an electrical radiation image (i.e., radiation image data). Typically, the radiation is X-rays. However, the radiation can be alpha rays (α-rays), beta rays (β-rays), and gamma rays (γ-rays). The radiation imaging system 200 can include, for example, a radiation imaging apparatus 210, a radiation source 230, an exposure control unit 220, and a computer 240. The radiation source 230 starts emitting radiation based on an exposure instruction (irradiation instruction) from the exposure control unit 220. The radiation imaging apparatus 210 is irradiated with the radiation emitted from the radiation source 230 through a subject (not illustrated).

The radiation imaging apparatus 210 includes a radiation detecting panel 212 and a control unit 214 that controls the radiation detecting panel 212. The control unit 214 can, for example, include a programmable logic device (PLD) such as a field programmable gate array (FPGA), an application specific integrated circuit (ASIC), a general-purpose computer with a program, or a combination of all or some of these components. The control unit 214 can include a sample-and-hold circuit and an analog circuit such as an operational amplifier.

The control unit 214 not only controls the radiation detecting panel 212, but also processes a signal output from the radiation detecting panel 212. The control unit 214 determines that radiation irradiation has been started if a measured value exceeds a threshold value, and then causes the radiation detecting panel 212 to start a radiation image capturing operation. The measured value is a value of a detection signal output from the radiation detecting panel 212 or a value acquired by processing such a detection signal.

Figure 2:
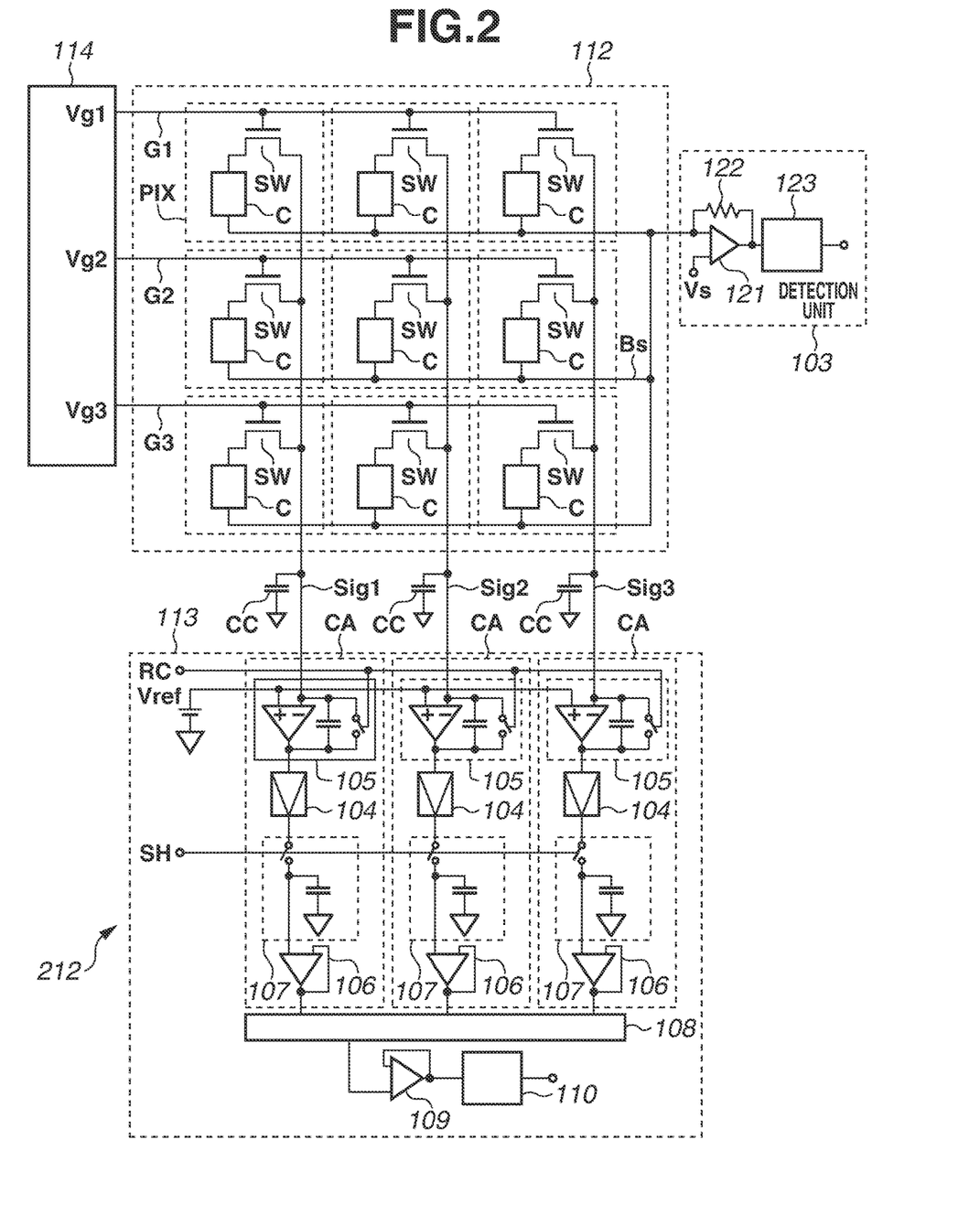
FIG. 2 is a diagram illustrating a configuration of a radiation detecting panel according to the first exemplary embodiment.

FIG. 2 illustrates an example of a configuration of the radiation detecting panel 212. The radiation detecting panel 212 includes a pixel array 112. The pixel array 112 includes a plurality of pixels PIX and a plurality of column signal lines Sig (Sig1, Sig2, Sig3). The plurality of pixels PIX is arranged in a matrix to detect radiation. In FIG. 2, the pixel array 112 includes 3-row×3-column of pixels PIX for the sake of simplicity. In practice, a larger number of pixels PIX can be arrayed. In one example, the radiation detecting panel 212 can have a size of 17 inches with approximately 3000-row×approximately 3000-column of pixels PIX.

The radiation detecting panel 212 includes a drive circuit (a row selection circuit) 114, a reading unit 113, and a detection unit 103. The drive circuit 114 drives the pixel array 112, and the reading unit 113 detects signals that appear in the plurality of column signal lines Sig of the pixel array 112. The detection unit 103 detects radiation irradiation. In this example, the detection unit 103 also serves as a bias circuit that applies a bias potential Vs to all or some of the plurality of pixels PIX in the pixel array 112 via a bias line Bs (a conductive line).

The detection unit 103 also serving as the bias circuit can include a differential amplifier 121 and a feedback resistor 122 that is connected between a first input terminal of the differential amplifier 121 and an output terminal of the differential amplifier 121. The differential amplifier 121 includes a second input terminal to which a bias potential Vs (a predetermined value) is supplied. The first input terminal and the second input terminal of the differential amplifier 121 have the same potentials by imaginary short. Thus, a potential of the bias line Bs is driven to the bias potential Vs by the differential amplifier 121. A current that flows in the bias line Bs, that is, a potential according to an electric signal that appears in the bias line Bs, is output to the output terminal of the differential amplifier 121. The current flowing in the bias line Bs is a signal having sensitivity to radiation irradiation.

When the radiation detecting panel 212 (the pixel array 112) is irradiated with radiation, an electric current based on the radiation irradiation flows in the bias line Bs. Thus, an electric signal correlated with a dosage of the radiation to the pixel array 112 appears in the output terminal of the differential amplifier 121. The detection unit 103 can include an analog/digital (A/D) converter 123 that performs analog to digital conversion of a signal output to the output terminal of the 121. Hereinafter, a signal that is output from the A/D converter 123 of the detection unit 103 and supplied to the control unit 214 is called a detection signal. A signal that is output to the output terminal of the differential amplifier 121 can be interpreted as a detection signal. An amplification circuit and/or a circuit, such as a filter, can be arranged between the differential amplifier 121 and the A/D converter 123. The A/D converter 123 can be provided in the control unit 214.

While the detection unit 103 detects the electric current flowing in the bias line Bs to detect irradiation of the pixel array 112 with radiation, such detection is one example. The irradiation of the pixel array 112 with radiation can be detected by detecting a potential of the column signal line Sig or an electric current flowing in the column signal line Sig. Alternatively, the irradiation of the pixel array 112 with radiation can be detected by reading a signal from some of the plurality of pixels PIX by the reading unit 113. Alternatively, a sensor dedicated to radiation detection can be arranged inside or outside the pixel array 112, so that irradiation of the pixel array 112 with radiation is detected by the radiation detecting sensor.

Each pixel PIX includes a conversion element C that detects radiation, and a switch SW that connects the conversion element C to a column signal line Sig (a column signal line Sig corresponding to the conversion element C out of the plurality of column signal lines Sig). The conversion element C outputs a signal corresponding to an amount of radiation that has entered into the conversion element C to the column signal line Sig. The conversion element C can include, for example, a metal insulator semiconductor (MIS) photodiode that is mainly made of amorphous silicon and arranged on an insulating substrate such as a glass substrate. Alternatively, the conversion element C can include a positive-intrinsic-negative (PIN) photodiode. The conversion element C can be configured as a direct-type conversion element that directly converts radiation into an electric signal, or an indirect-type conversion element that converts radiation into light and then detects the light. In the indirect-type conversion element, a scintillator can be shared by the plurality of pixels PIX.

The switch SW can include a transistor such as a thin-film transistor (TFT) including, for example, a control terminal (a gate) and two main terminals (a source and a drain). The conversion element C includes two main electrodes. One of the main electrodes of the conversion element C is connected to one of the two main terminals of the switch SW, and the other main electrode of the conversion element C is connected to the bias line Bs. In each pixel PIX in a first row, a control terminal of a switch SW is connected to a gate line G1. In each pixel PIX in a second row, a control terminal of a switch SW is connected to a gate line G2. In each pixel PIX in a third row, a control terminal of a switch SW is connected to a gate line G3. The drive circuit 114 supplies gate signals Vg1, Vg2, Vg3 . . . to the gate lines G1, G2, G3 . . . , respectively.

In each pixel PIX in a first column, one of main terminals of a switch SW is connected to the first column signal line Sig1. In each pixel PIX in a second column, one of main terminals of a switch SW is connected to the second column signal line Sig2. In each pixel PIX in a third column, one of main terminals of a switch SW is connected to the third column signal line Sig3. Each of the column signal lines Sig (Sig1, Sig2, Sig3, . . . ) has a capacity CC.

The reading unit 113 includes a plurality of column amplification units CA such that one column amplification unit CA corresponds to one column signal line Sig. Each column amplification unit CA can include, for example, an integral amplifier 105, a variable amplifier 104, a sample-and-hold circuit 107, and a buffer circuit 106. The integral amplifier 105 amplifies the signal that appears in the column signal line Sig corresponding to the integral amplifier 105. The integral amplifier 105 can, for example, include an operational amplifier, an integral capacitance, and a reset switch. The integral capacitance and the reset switch are connected in parallel between an inversion input terminal and an output terminal of the operational amplifier. The operation amplifier includes a non-inversion input terminal to which a reference potential Vref is supplied. The reset switch is turned ON when a reset signal RC driven by the control unit 214 is activated, so that not only the integral capacitance is reset, but a potential of the column signal line Sig is also reset to the reference potential Vref.

The variable amplifier 104 performs amplification using a set amplification factor from the integral amplifier 105. A sample-and-hold signal SH driven by the control unit 214 is activated, so that the sample-and-hold circuit 107 performs sampling and holding of a signal from the variable amplifier 104. The sample-and-hold circuit 107 can include, for example, a sampling switch and a sampling capacitor. The buffer circuit 106 buffers (converts impedance of) the signal from the sample-and-hold circuit 107, and outputs the resultant signal. The sampling switch can be controlled based on a sampling pulse supplied from the control unit 214.

The reading unit 113 includes a multiplexer 108. The multiplexer 108 selects signals in predetermined order from the plurality of column amplification units CA provided to correspond to the plurality of respective column signal lines Sig, and outputs the selected signals. For example, the multiplexer 108 includes a shift register. The shift register performs a shift operation according to a clock signal supplied from the control unit 214, and selects one signal from the plurality of column amplification units CA. The detection unit 103 can include a buffer 109 and an AD converter 110. The buffer 109 buffers (converts impedance of) a signal output from the multiplexer 108. The A/D converter 110 converts an analog signal output from the buffer 109 into a digital signal. An output from the A/D converter 110, that is, radiation image data, is supplied to the computer 240.

Operations performed by the radiation imaging apparatus 210 include an initialization operation, an accumulating operation, and a read operation. The radiation imaging apparatus 210 performs the initialization operation to initialize the plurality of pixels PIX of the pixel array 112 on a row basis. The radiation imaging apparatus 210 performs the accumulating operation to accumulate electric charges generated in each pixel PIX of the pixel array 112 by radiation irradiation. The radiation imaging apparatus 210 performs the read operation to read a signal from the pixel array 112 and to output the read signal as an image (an image signal). The signal corresponds to the electric charges accumulated in each pixel PIX of the pixel array 112 by irradiation of the pixel array 112 with radiation and is read from the pixel array 112.

The operation shifts from the initialization operation to the accumulating operation when the control unit 214 determines, based on the detection signal output from the detection unit 103, that irradiation of the radiation imaging apparatus 210 with radiation has started. The operation shifts from the accumulating operation to the read operation, for example, when a predetermined time elapses from the start of the accumulating operation.

Figure 3:
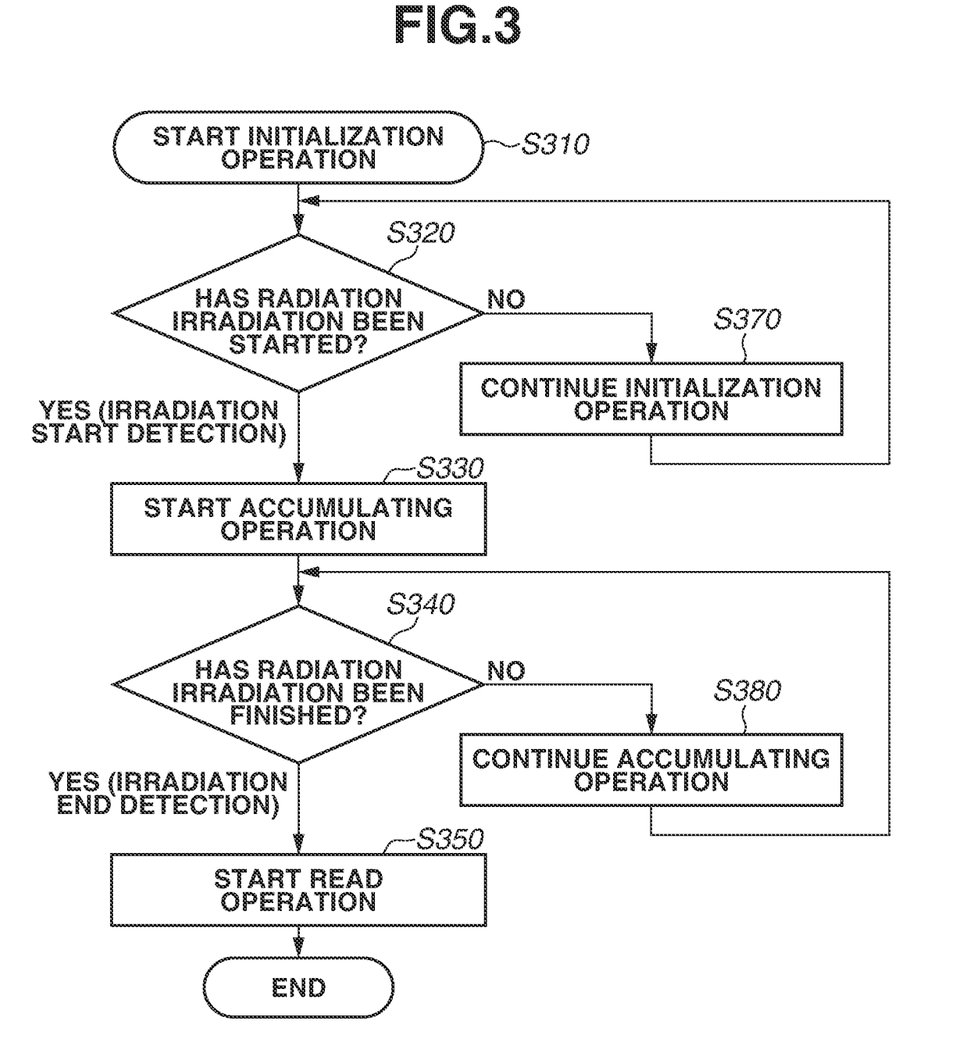
FIG. 3 is a flowchart illustrating an operation performed by a radiation imaging apparatus according to the first exemplary embodiment.
Figure 4:
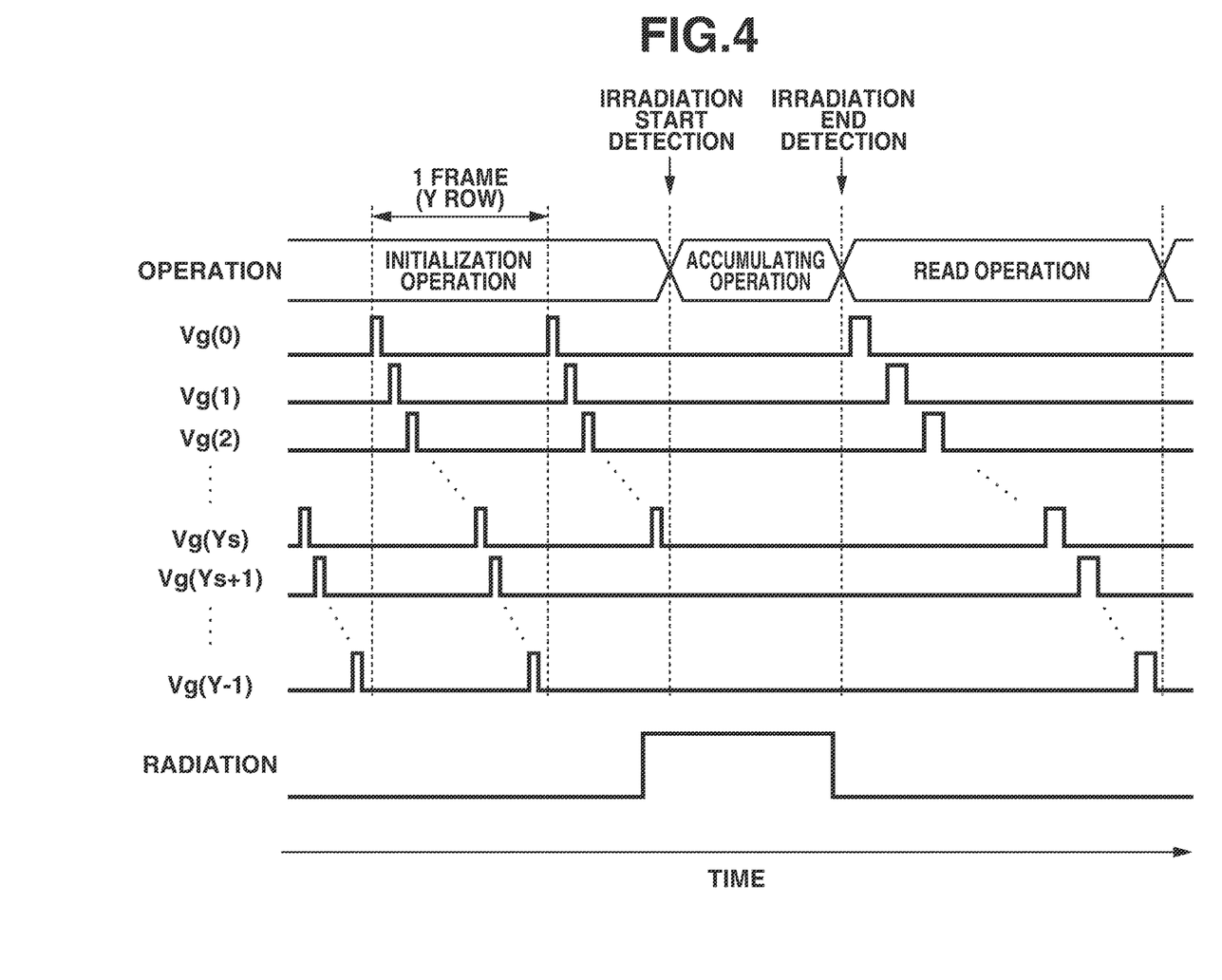
FIG. 4 is a diagram illustrating the operation performed by the radiation imaging apparatus according to the first exemplary embodiment.

The operations performed by the radiation imaging apparatus 210 are described with reference to FIGS. 3 and 4. In step S310, the control unit 214 starts the initialization operation. In the initialization operation, the control unit 214 repeats an operation for sequentially setting gate lines G (G1, G2, G3, . . . ) in the first row through the last row to an active level and setting a reset signal RC to an active level. Herein, when the reset signal RC is set to the active level, the integral amplifier 105 shifts to a voltage follower state, and the reference voltage Vref is supplied to the signal line Sig. In this state, a switch SW in a row with a gate line G that is set to the active level is shifted to a conductive state, and the electric charges accumulated in a capacity Cs of a conversion element 201 are initialized. In FIG. 4, Vg(0), Vg(1), Vg(2), . . . , Vg(Ys), Vg(Ys+1), . . . Vg (Y−1) indicate drive signals supplied to the gate lines G in the first row through the last row of the pixel array 112.

In a period of the initialization operation, the detection unit 103 outputs a detection signal correlated with a dosage of the radiation to the pixel array 112. In the course of the initialization operation, in step S320, the control unit 214 determines whether radiation irradiation has started. The control unit 214 determines whether irradiation of the pixel array 112 with radiation has started based on the detection signal output from the detection unit 103.

In step S370, the control unit 214 continues the initialization operation until the control unit 214 determines that the irradiation of the pixel array 112 with radiation has started. If the control unit 214 determines that the irradiation of the pixel array 112 with radiation has started (YES in step S320), the processing proceeds to step S330. In step S330, the control unit 214 starts the accumulating operation. In other words, when the start of the radiation irradiation is detected ("irradiation start detection" in FIG. 4), the operation of the radiation imaging apparatus 210 shifts from the initialization operation to the accumulating operation. The processing in step S320 is described below.

The control unit 214 can selectively execute determination of whether radiation irradiation has started in either a first mode or a second mode having higher sensitivity than the first mode. The number of rows that can be initialized at a time is greater in the second mode than that in the first mode. Since the number of detection signals that can be acquired at a time in the second mode is greater than that in the first mode, detection sensitivity increases in the second mode. Since detection sensitivity in the first mode is lower than that in the second mode, it is preferable that an upper limit is not set with respect to a change in a threshold value. Herein, if the second mode is used for the determination, the control unit 214 changes the threshold value within a predetermined range. If the first mode is used for the determination, the control unit 214 does not set a limit on a range in which the threshold value is changed. The operation for changing a threshold value within a predetermined range by the control unit 214 will be described with reference to FIG. 10.

In the course of the accumulating operation, in step S340, the control unit 214 determines whether the radiation irradiation has finished. A method for determining finishing of the radiation irradiation is not limited. For example, the control unit 214 can determine that the radiation irradiation has finished if a predetermined time elapses from the beginning of the accumulating operation. Alternatively, the control unit 214 can determine that the irradiation of the pixel array 112 with radiation has finished based on one or more of a momentary value, an integral value, and a differential value of a detection signal output from the detection unit 103.

In step S380, the control unit 214 continues the accumulating operation until the control unit 214 determines that the irradiation of the pixel array 112 with radiation is finished. If the control unit 214 determines that the irradiation of the pixel array 112 with radiation has finished (YES in step S340), the processing proceeds to step S350. In step S350, the control unit 214 starts the read operation. In other words, when the control unit 214 determines that the radiation irradiation has finished ("irradiation end detection" in FIG. 4), the operation shifts from the accumulating operation to the read operation. In the read operation, signals are read in order from a pixel in the top row to a pixel in the last row of the pixel array 112.

Figure 5:
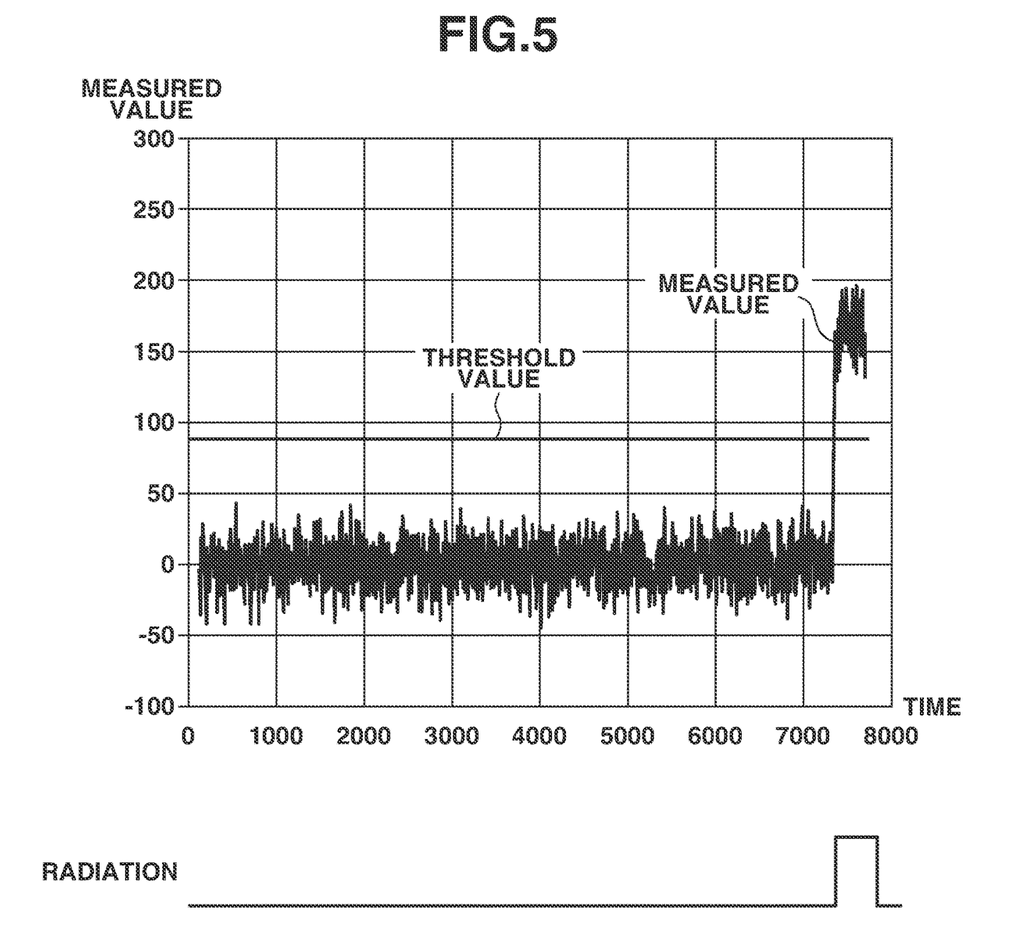
FIG. 5 is a diagram illustrating detection of start of radiation irradiation in a comparative example.
Figure 6:
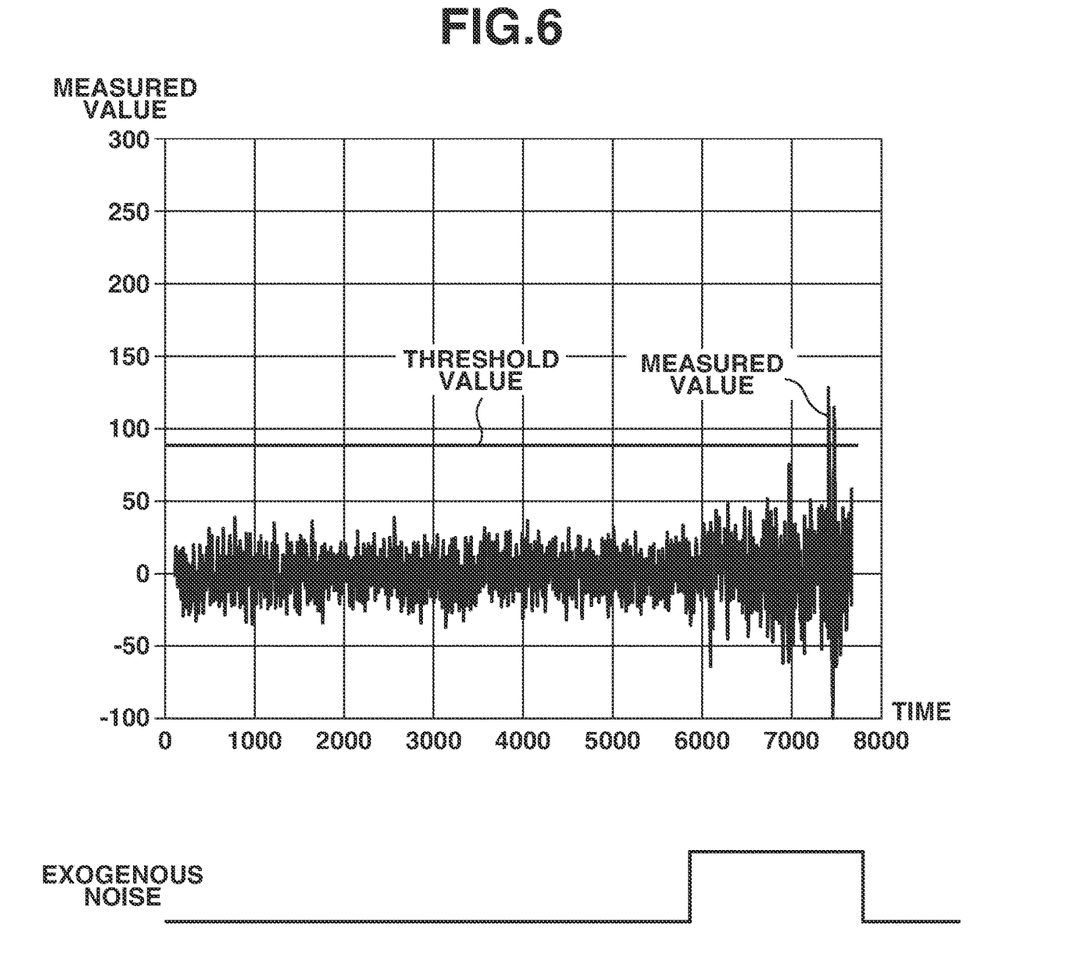
FIG. 6 is a diagram illustrating detection of start of radiation irradiation in a comparative example.

FIGS. 5 and 6 illustrate detection of start of radiation irradiation in comparative examples. FIG. 5 illustrates an operation performed when system noise is included in a measured value that can be acquired using the detection unit 103 by the control unit 214. FIG. 6 illustrates an operation performed when exogenous noise in addition to system noise is included in a measured value that can be acquired using the detection unit 103 by the control unit 214. The measured value is a value of a detection signal output from the detection unit 103 of the radiation detecting panel 212 or a value acquired by processing such a detection signal.

Herein, the value acquired by processing the detection signal output from the detection unit 103 is, for example, a value that can be acquired by performing a process (e.g., amplification, filtering, integral calculation, and moving average calculation) on the detection signal output from the detection unit 103 by the control unit 214. Alternatively, the value acquired by processing the detection signal output from the detection unit 103 can be a value that can be acquired by processing the detection signal output from the detection unit 103 by another unit (not illustrated).

When the radiation imaging apparatus 210 is irradiated with radiation, an electric current flows in the bias line Bs. The measured value acquired using the detection unit 103 is information having a correlation with the electric current flowing in the bias line Bs. In step S320, if the measured value exceeds a threshold value, the control unit 214 determines that irradiation of the radiation imaging apparatus 210 with radiation has started. Even if the radiation imaging apparatus 210 is not irradiated with radiation, the measured value includes random noise. Such noise is system noise. The threshold value can be set to, for example, greater than or equal to 8σ if a standard deviation of the system noise is σ. As illustrated in FIG. 5, when there is no exogenous noise, a threshold value can be set to approximately 8σ of the system noise. If the threshold value is set to approximately 8σ of the system noise, the start of radiation irradiation can be detected without issues.

If there is exogenous noise, as illustrated in FIG. 6, a measured value can exceed a threshold value due to the exogenous noise. In such a case, the control unit 214 can determine that radiation irradiation has started, even though the radiation irradiation has not started. Such determination is called incorrect detection. If the incorrect detection occurs, the operation shifts to the accumulating operation (step S330). Consequently, a radiation image cannot be captured until the initialization operation is re-started. Such a state can, for example, last approximately several seconds. Therefore, the radiation imaging apparatus in which incorrect detection occurs provides poor usability. If the threshold value is increased, weak radiation cannot be detected.

Conceivable typical exogenous noise sources on a medical site include:
- Approach of a radiation imaging apparatus to a device (e.g., a cathode ray tube (CRT)) that generates an electromagnetic wave
- Turning on and/or off of a device (e.g., a radiation source)
- Driving of a motor (e.g., a surgical electric drill, and a motor for rotary anode of a radiation source)
- Strong impact (e.g., collision)

In some types of radiation sources, for example, when a switch is pressed, an anode inside a radiation tube starts to rotate in response to the pressing of the switch. Herein, an electromagnetic wave is generated. Such electromagnetic wave causes a measured value to exceed a threshold value, and incorrect detection occurs. In such a case, since radiation irradiation is performed immediately after the incorrect detection, there is a possibility that normal photography may not be performed.

Figure 7:
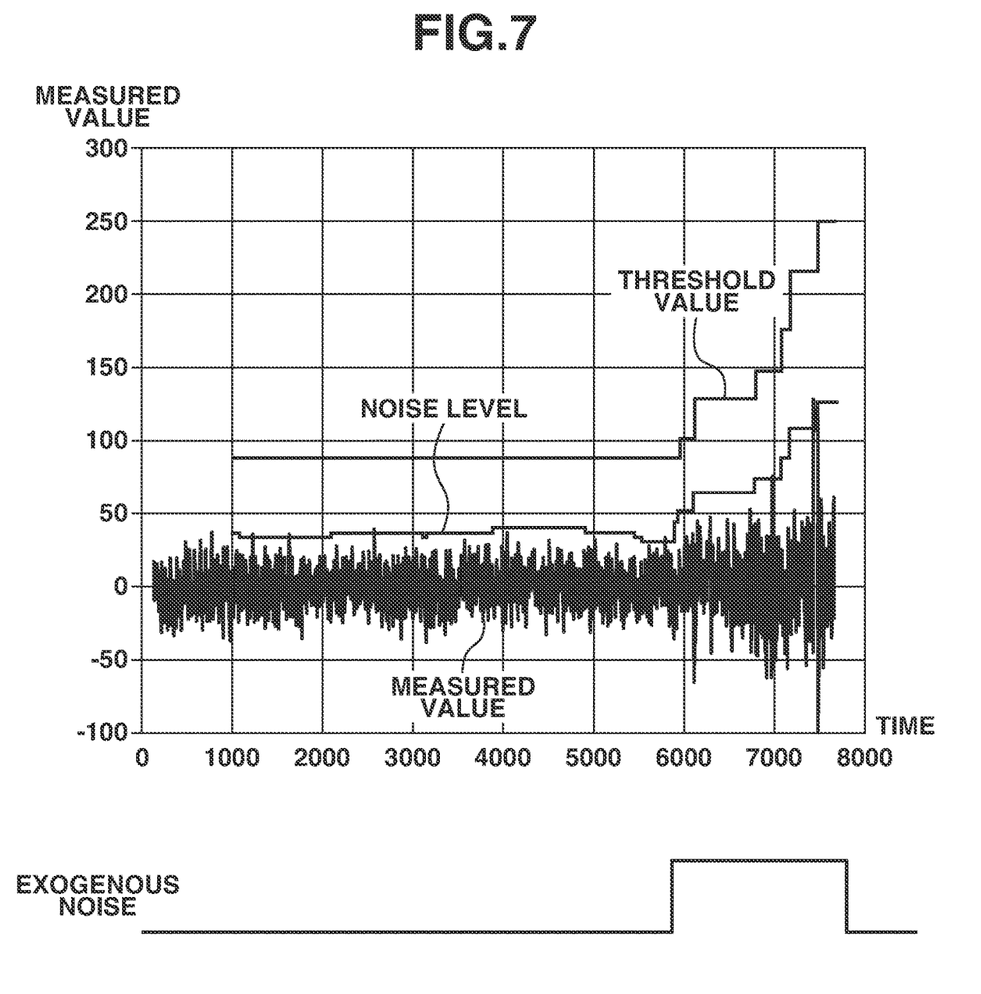
FIG. 7 is a diagram illustrating detection of start of radiation irradiation in the radiation imaging apparatus according to the first exemplary embodiment.
Figure 8:
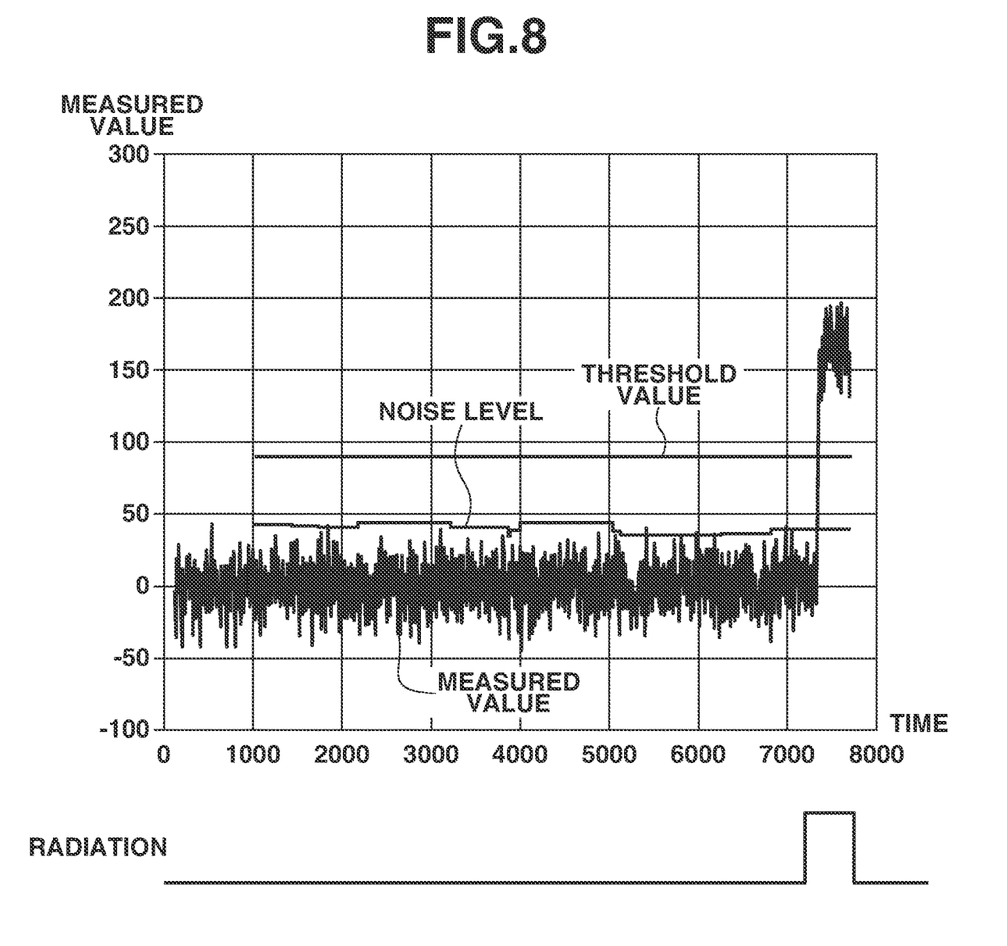
FIG. 8 is a diagram illustrating detection of radiation irradiation start in the radiation imaging apparatus according to the first exemplary embodiment.

Hereinafter, the principle of a method (an irradiation start detecting method) for detecting start of radiation irradiation in the radiation imaging apparatus 210 according to the first exemplary embodiment will be described with reference to FIGS. 7 and 8. A value of a detection signal output from the detection unit 103 or a value acquired by processing such a detection signal has characteristics as follow:

When a radiation imaging apparatus is irradiated with radiation, a measured value changes in such a way that a difference between the measured value and a reference value increases in a positive range or a negative range with respect to the reference value.

When exogenous noise is added, a measured value changes in both a positive range and a negative range with respect to a reference value.

A waveform of exogenous noise in a positive range with respect to a reference value and a waveform of exogenous noise in a negative range with respect to the reference value are substantially symmetrical.

Herein, for example, a reference value is 0. An average value of system noise is normally 0. In the example illustrated in each of FIGS. 7 and 8, the measured value changes in such a way that a difference between the measured value and the reference value increases in a positive range with respect to the reference value (0) when the radiation imaging apparatus is irradiated with radiation. However, the detection unit 103 or the control unit 214 can be configured in such a way that a difference between the measured value and the reference value increases in a negative range with respect to the reference value (0) when the radiation imaging apparatus is irradiated with radiation.

Thus, in a configuration in which a difference between a measured value and a reference value increases in one range out of a positive range and a negative range with respect to the reference value when radiation irradiation is received, the control unit 214 changes a threshold value based on a measured value in the other range out of the positive range and the negative range. For example, in a configuration in which a difference between a measured value and a reference value increases in a positive range with respect to the reference value when radiation irradiation is received, the control unit 214 changes a threshold value based on a measured value in a negative range. In a configuration in which a difference between a measured value and a reference value increases in a negative range with respect to the reference value when radiation irradiation is received, the control unit 214 changes a threshold value based on a measured value in a positive range.

The terms "one range" and "the other range" used above are referred to as "a monitoring range" and "a noise evaluating range", respectively. While changing a threshold value based on a measured value in the noise evaluating range, the control unit 214 determines that the radiation irradiation has been performed if a measured value in the monitoring range exceeds the threshold value. In the example illustrated in each of FIGS. 7 and 8, a range in which a measured value represents a positive value is the monitoring range, whereas a range in which a measured value represents a negative value is the noise evaluating range.

In one example, the control unit 214 estimates a noise level included in a measured value based on an envelope of the measured value in the noise evaluating range, and changes the threshold value according to the noise level. According to such a method, even when the addition of exogenous noise increases the measured value as illustrated in FIG. 7, the threshold value increases in response to the increase in the measured value. Hence, incorrect detection does not occur. When exogenous noise is not added as illustrated in FIG. 8, the control unit 214 does not change the threshold value. Therefore, the start of radiation irradiation can be correctly detected while incorrect detection can be prevented regardless of whether exogenous noise is added.

Hereinafter, an example in which the control unit 214 changes a threshold value is described with reference to FIG. 9. In this example, the control unit 214 estimates (determines) a noise level included in a measured value based on a maximum value (an envelope) of the measured value in the noise evaluating range, and changes a threshold value according to such a noise level. Herein, three examples of a method for estimating the noise level are described below.

Figure 9:
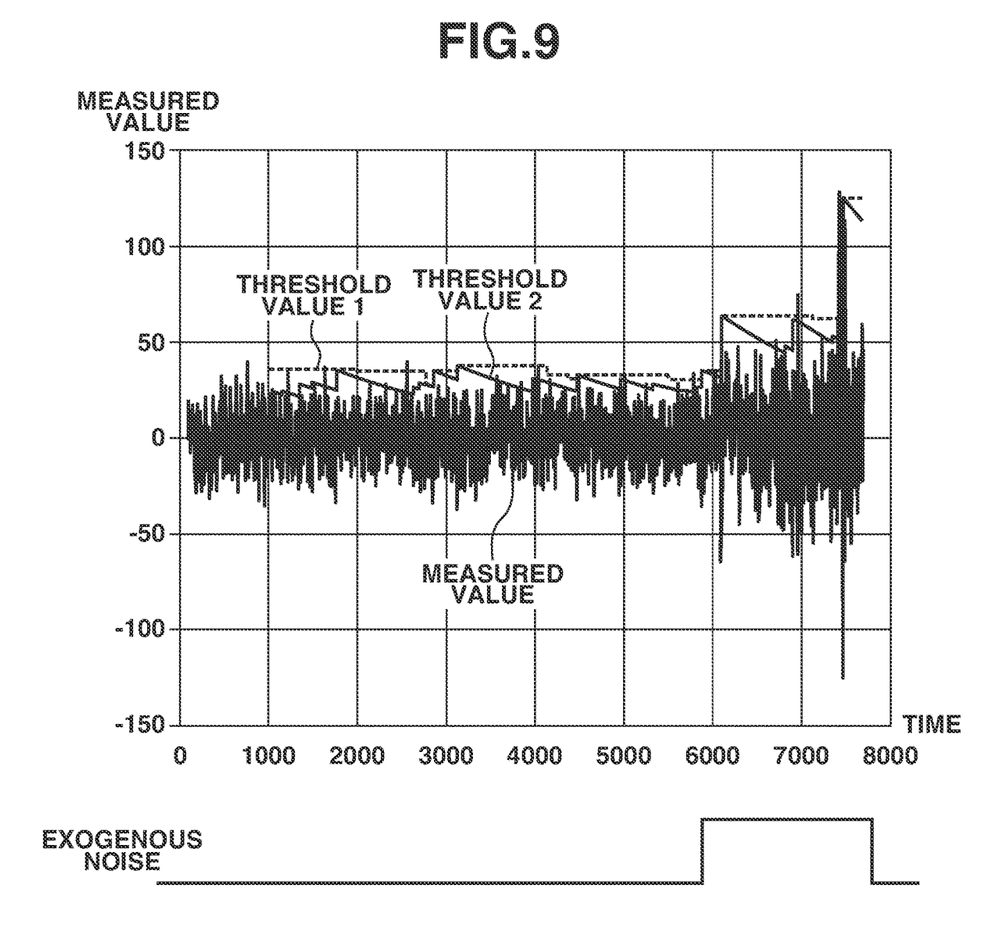
FIG. 9 is a diagram illustrating detection of start of radiation irradiation in the radiation imaging apparatus according to the first exemplary embodiment.

A first noise-level estimating method uses the maximum value of an amplitude value (an absolute value) of a plurality of measured values in a noise evaluating range (a range in which the measured values are negative in FIG. 9). A noise level A(t) at a time t is expressed by an Equation (1):

$$A(t)=\max\{-V(t),-V(t-1),\ldots,-V(t-n-1)\} \quad (1)$$

V(t) is a measured value within the noise evaluating range at the time t, and n is a section used for calculation of the maximum value.

According to a second noise-level estimating method, a noise level A(t) at a time t is expressed by Equation (2):

$$A(t)=\max\{-V(t),A(t-1)*a\} \quad (2)$$

V(t) is a measured value within the noise evaluating range at the time t, A(t−1) is a past noise level, and α is a constant value (α<1).

According to a third noise-level estimating method, a noise level A(t) at a time t is expressed by Equation (3):

$$A(t)=\max\{-V(t),A(t-1)-\beta\} \quad (3)$$

V(t) is a measured value within the noise evaluating range at the time t, A(t−1) is a past noise level, and β is a constant value (β>0).

The noise level estimating (determining) methods are not limited to the first, second, and third methods. Any other applicable methods can be employed.

Next, an example of a method by which the control unit 214 determines a threshold value T'(t+Δt) at a time t+Δt based on a noise level A(t) at a time t will be described. The noise level includes exogenous noise and system noise. A noise level A(t) is expressed by Equation (4):

$$A(t)=Ae(t)+Ai(t) \quad (4),$$

Ae(t) is an exogenous noise level, and Ai(t) is a system noise level.

If the system noise has a standard deviation of σ, the system noise level Ai(t) can be approximately 3σ to 4σ. This value is constant regardless of time. In other words, a value acquired by subtracting Ai(t)=3σ to 4σ from A(t) can be considered as the exogenous noise level Ae(t). In such an example, however, the exogenous noise level cannot be a negative value. In other words, the exogenous noise level is expressed by Equation (5):

$$Ae(t)=\max\{A(t)-Ai,0\} \quad (5)$$

The threshold value T'(t+Δt) at the time t+Δt needs to be set to a value in which incorrect detection due to the system noise or the exogenous noise does not occur. If a threshold value without the exogenous noise is T, the threshold value T'(t+Δt) desirably satisfies Equation (6):

$$T'(t+\Delta t)=k*Ae(t)+T \quad (6)$$

In Equation 6, k is a safety factor. Although an increase in the safety factor k enhances incorrect detection tolerance, detection capability tends to be degraded when exogenous noise is added. Therefore, it is desirable that the safety factor k be adjustable. In other words, a sum of a value acquired by multiplying an exogenous noise level by the safety factor k and a predetermined threshold value T is desirably set as a new threshold value. Accordingly, the threshold value T'(t+Δt) is set as described above, so that the start of the radiation irradiation can be correctly detected while incorrect detection due to the exogenous noise can be prevented.

Figure 10:
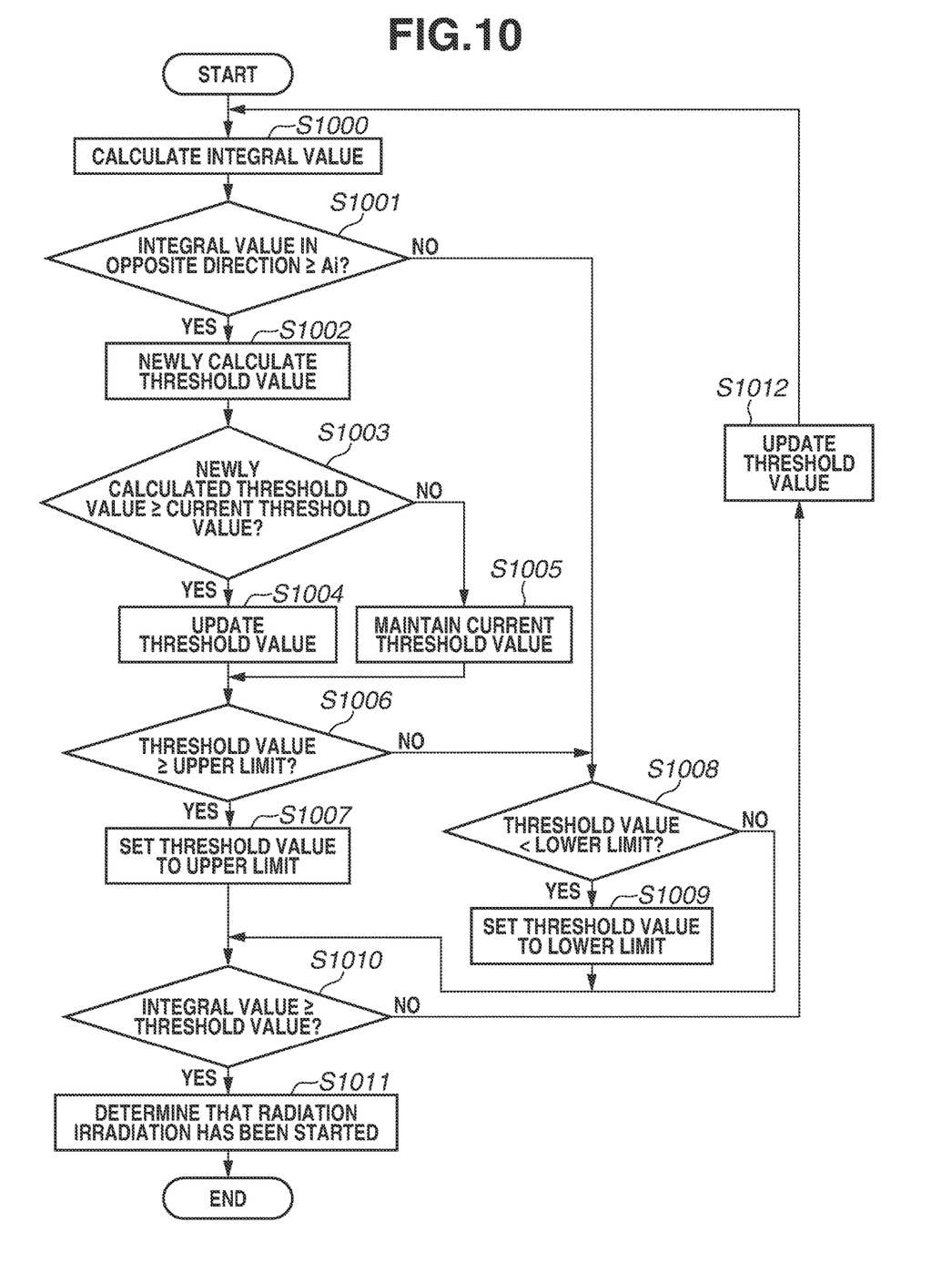
FIG. 10 is a flowchart illustrating an operation for changing a threshold value according to the first exemplary embodiment.

FIG. 10 is a flowchart illustrating an operation for changing a threshold value. In FIG. 9, when a threshold value reaches an upper limit through control of the threshold value, the control unit 214 controls the threshold value in such a way that the threshold value is maintained at the upper limit for a predetermined time. In FIG. 10, when a threshold value reaches an upper limit through control of the threshold value, the control unit 214 controls the threshold value in such a way that the threshold value is changed before a next row is initialized.

In step S1000, the control unit 214 calculates an integral value of a detection signal output from the detection unit 103. In step S1001, the control unit 214 determines whether an integral value in a direction opposite a direction used for determination with respect to a reference value is greater than or equal to a system noise level Ai (hereinafter Ai).

If the control unit 214 determines that the integral value in the opposite direction is greater than or equal to Ai (YES in step S1001), the processing proceeds to step S1002. If control unit 214 determines that the integral value in the opposite direction is less than Ai (NO in step S1001), the processing proceeds to step S1008.

Since the integral value in the opposite direction is greater than or equal to Ai, influence of exogenous noise is significant. Thus, in step S1002, the control unit 214 updates a threshold value. An updated threshold value NewTH is expressed by Equation (7):

$$\text{NewTH}=T+k(A(t)-Ai) \quad (7)$$

In Equation 7, T is a threshold value when there is no exogenous noise, k is a safety factor, and A(t) is a noise level. After the control unit 214 updates the threshold value, the processing proceeds to step S1003.

In step S1003, the control unit 214 compares the updated threshold value NewTH with a value (CurrentTH) acquired by multiplying a threshold value prior to the update by a threshold value depression coefficient (α). The control unit 214 compares the threshold value prior to the update with the threshold value subsequent to the update.

If the newly calculated threshold value NewTH is greater than or equal to the currently set threshold value CurrentTH (YES in step S1003), the processing proceeds to step S1004. If the currently set threshold value CurrentTH is greater than the newly calculated threshold value NewTH (NO in step S1003), the processing proceeds to step S1005.

In step S1004, the control unit 214 updates the threshold value used for detection determination from the current threshold value to the newly calculated threshold value NewTH. In step S1005, the control unit 214 maintains the current threshold value.

In step S1006, the control unit 214 compares an upper limit UP_LIMIT of the threshold value with the threshold value. If the control unit 214 determines that the threshold value is greater than or equal to the upper limit UP_LIMIT of the threshold value (YES in step S1006), the processing proceeds to step S1007. If the control unit 214 determines that the threshold value is less than the upper limit UP_LIMIT of the threshold value (NO in step S1006), the processing proceeds to step S1008. In step S1007, the control unit 214 sets the threshold value to the upper limit UP_LIMIT.

In step S1008, the control unit 214 compares the threshold value with a lower limit LOW_LIMIT of the threshold value. If the control unit 214 determines that the threshold value is greater than or equal to the lower limit LOW_LIMIT of the threshold value (NO in step S1008), the processing proceeds to step S1010. If the control unit 214 determines that the threshold value is less than the lower limit LOW_LIMIT of the threshold value (YES in step S1008), the processing proceeds to step S1009. In step S1009, the control unit 214 sets the threshold value to the lower limit LOW_LIMIT.

In step S1010, the control unit 214 compares the calculated integral value with the updated threshold value to make detection determination. If the control unit 214 determines that the calculated integral value is greater than or equal to the threshold value (YES in step S1010), the processing proceeds to step S1011. If the control unit 214 determines that the calculated integral value is less than the threshold value (NO in step S1010), the processing proceeds to step S1012.

In step S1011, the control unit 214 determines that radiation irradiation has started if the calculated integral value is greater than or equal to the threshold value. Then, the determination processing ends.

In step S1012, the control unit 214 decreases the current threshold value to update the threshold value. The control unit 214 multiplies the current threshold value CurrentTH by the threshold value depression coefficient α to update the current threshold value CurrentTH. Based on the update in step S1012, the control unit 214 executes step S1000.

In step S1000, the control unit 214 drives a next row in the pixel array 112, and integrates an electric charge generated by the drive of the next row. The control unit 214 sequentially repeats the initialization operation on the pixel array 112 until the detection operation is detected.

According to the flowchart illustrated in FIG. 10, the control unit 214 determines whether to change a threshold value during a time period after the pulse signal indicated by Vg(n) in FIG. 4 is output and before the detection unit 103 performs the X-ray detection determination. Then, the control unit 214 performs the X-ray detection determination, and outputs a pulse signal Vg(n+1). In other words, the control unit 214 determines whether to change a threshold value in a time period between initialization of a certain row (a first row) in a plurality of pixels of the pixel array 112 and initialization of a row next to the first row in the course of the initialization operation for initializing the plurality of pixels in the pixel array 112 on a row basis.

For this reason, the radiation imaging apparatus according to the present exemplary embodiment can obtain predetermined sensitivity while dynamically preventing incorrect detection. If a threshold value is increasing, high detection sensitivity can be maintained by changing (decreasing) the threshold value before X-ray detection determination.

The control unit 214 uses an integral value of a detection signal output from the detection unit 103 to perform the determination. The control unit 214 can use the detection signal as is instead of the integral value to perform the determination.

Herein, the threshold value can be controlled so as to be increased. Such control causes degradation in the sensitivity. In a case where sensitivity is prioritized, if a threshold value is greater than an upper limit, the control unit 214 preferably determines whether to change the threshold value and then controls the threshold value in such a way that the threshold value is decreased. In a case where prevention of incorrect detection is prioritized, if a threshold value is greater than an upper limit, the control unit 214 controls the threshold value in such a way that the threshold value is fixed to the upper limit only during a period in which the threshold value is greater than the upper limit.

In the present exemplary embodiment, the radiation imaging apparatus uses information about an electric current that flows in the bias line Bs to determine the start of X-ray irradiation and calculate a noise level. The present exemplary embodiment is not limited to such a configuration. For example, the radiation imaging apparatus can use another sensor different from a two-dimensional detector to determine the start of X-ray irradiation. Even in such a configuration of the radiation imaging apparatus, incorrect detection due to exogenous noise can occur. Therefore, a countermeasure according to the present exemplary embodiment is important.

The units such as the control unit 214 according to the above-described exemplary embodiment can be realized when a computer executes a program. A unit for supplying a program to a computer can be applied as an exemplary embodiment. Such a unit includes, for example, a computer readable recording medium such as a compact disc-read-only memory (CD-ROM) in which the program is recorded, and a transmission medium such as the Internet that transmits the program. Such a program may be applied as an exemplary embodiment. The categories of the exemplary embodiment are to encompass the program, the recording medium, the transmission medium, and a program product.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-196897, filed Oct. 5, 2016, which is hereby incorporated by reference herein in its entirety.

What is claimed is:
1. A radiation imaging apparatus comprising:
a pixel array in which a plurality of pixels is arrayed to capture a radiation image;

a detection unit configured to detect irradiation of the pixel array with radiation to acquire measured values, wherein the measured values relative to a reference value include positive values and negative values; and a control unit configured to control a radiation image capturing operation performed by the pixel array according to determination of start of radiation irradiation, wherein the determination is based on comparison between the measured values relative to the reference value and a threshold value that is either in a positive or negative range, and wherein the control unit changes the threshold value, to change the threshold value within a predetermined range according to measured values in a range opposite the positive or negative range of the threshold value among the measured values, according to determination of whether to change the threshold value based on comparison between a value calculated from a current threshold value based on the measured values in the opposite range and at least one of an upper limit and a lower limit of the predetermined range during a time period between initialization of a first row in the plurality of pixels in the pixel array and initialization of a row next to the first tow in course of an initialization operation for initializing the plurality of pixels in the pixel array on a row basis.

2. The radiation imaging apparatus according to claim 1, wherein the detection unit includes a differential amplifier configured to differentially amplify a difference between a signal with sensitivity to radiation irradiation and a predetermined value, and wherein the control unit acquires one of the measured values based on a signal output from the differential amplifier.

3. The radiation imaging apparatus according to claim 2, wherein the signal with the sensitivity to radiation irradiation includes a signal that appears in a conductive line arranged in the pixel array.

4. The radiation imaging apparatus according to claim 3, wherein the conductive line includes a bias line that applies a bias potential to all or some of the plurality of pixels, and wherein the signal with the sensitivity to radiation irradiation includes a signal that appears in the bias line.

5. The radiation imaging apparatus according to claim 1, wherein the control unit changes the threshold value by setting the threshold value to the calculated value in a case where the threshold value is smaller than the upper limit and greater than the lower limit.

6. The radiation imaging apparatus according to claim 1, wherein, if the threshold value is greater than the upper limit, the control unit decreases the threshold value after whether to change the threshold value is determined.

7. The radiation imaging apparatus according to claim 1, wherein, if the threshold value is greater than the upper limit, the control unit controls the threshold value such that the threshold value is fixed to the upper limit only during a period in which the threshold value is greater than the upper limit.

8. The radiation imaging apparatus according to claim 1, wherein the control unit selectively executes determination of whether the radiation irradiation has started in one of a first mode or a second mode with higher sensitivity than the first mode, wherein the control unit changes the threshold value within the predetermined range if the control unit executes the determination in the second mode, and wherein the control unit does not set a limit on a range in which the threshold value is changed if the control unit executes the determination in the first mode.

9. A radiation imaging system comprising:
the radiation imaging apparatus according to claim 1; and
a radiation source configured to irradiate the radiation imaging apparatus with radiation.

10. A radiation imaging apparatus comprising:
a pixel array in which a plurality of pixels is arrayed to capture a radiation image;
a detection unit configured to detect irradiation of the pixel array with radiation to acquire measured values, wherein the measured values relative to a reference value include positive values and negative values; and
a control unit configured to control a radiation image capturing operation performed by the pixel array according to determination of start of radiation irradiation,
wherein the determination is based on comparison between the measured values relative to the reference value and a threshold value that is either in a positive or negative range,
wherein the control unit changes the threshold value, to change the threshold value within a predetermined range according to measured values in only a range opposite the positive or negative range of the threshold value among the measured values, according to determination of whether to change the threshold value based on comparison between a value calculated from a current threshold value based on the measured values in only the opposite range and at least one of an upper limit and a lower limit of the predetermined range during a time period between initialization of a first row in the plurality of pixels in the pixel array and initialization of a row next to the first row in course of an initialization operation for initializing the plurality of pixels in the pixel array on a row basis.

11. The radiation imaging apparatus according to claim 10, wherein the control unit changes the threshold value by setting the threshold value to the calculated value in a case where the threshold value is smaller than the upper limit and greater than the lower limit, and the control unit sets the threshold value to the lower limit in a case where the threshold value is smaller than the lower limit.

12. The radiation imaging apparatus according to claim 10, wherein, if the threshold value is greater than the upper limit, the control unit decreases the threshold value after performing the determination.

13. The radiation imaging apparatus according to claim 10, wherein, if the threshold value is greater than the upper limit, the control unit controls the threshold value in such a way that the threshold value is fixed to the upper limit only during a period in which the threshold value is greater than the upper limit.

14. A radiation imaging system comprising:
the radiation imaging apparatus according to claim 10; and
a radiation source configured to irradiate the radiation imaging apparatus with radiation.

15. A radiation imaging apparatus comprising:
a pixel array in which a plurality of pixels is arrayed to capture a radiation image;
a detection unit configured to detect irradiation of the pixel array with radiation to acquire measured values, wherein the measured values relative to a reference value include positive values and negative values; and a control unit configured to control a radiation image capturing operation performed by the pixel array according to determination of start of radiation irradiation, wherein the determination is based on comparison between the measured values relative to the reference value and a threshold value that is either in a positive or negative range, wherein the control unit changes the threshold value, to change the threshold value within a predetermined range according to the measured values excluding values in the positive or negative range, according to determination of whether to change the threshold value based on comparison between a value calculated from a current threshold value based on the measured values in the opposite range and at least one of an upper limit and a lower limit of the predetermined range during a time period between initialization of a first row in the plurality of pixels in the pixel array and initialization of a row next to the first row in course of an initialization operation for initializing the plurality of pixels in the pixel array on a row basis.

16. The radiation imaging apparatus according to claim 15, wherein the control unit changes the threshold value by setting the threshold value to the calculated value in a case where the threshold value is smaller than the upper limit and greater than the lower limit, and the control unit sets the threshold value to the lower limit in a case where the threshold value is smaller than the lower limit.

17. The radiation imaging apparatus according to claim 15, wherein, if the threshold value is greater than the upper limit, the control unit decreases the threshold value after performing the determination.

18. The radiation imaging apparatus according to claim 15, wherein, if the threshold value is greater than the upper limit, the control unit controls the threshold value such that the threshold value is fixed to the upper limit only during a period in which the threshold value is greater than the upper limit.

19. A radiation imaging system comprising:
the radiation imaging apparatus according to claim 15; and
a radiation source configured to irradiate the radiation imaging apparatus with radiation.

* * * * *